(12) United States Patent
Tatsuta

(10) Patent No.: US 9,957,400 B2
(45) Date of Patent: May 1, 2018

(54) INK SET FOR INK JET AND METHOD FOR PRODUCING INK JET PRINTED MATTER

(71) Applicant: SEIREN CO., LTD, Fukui (JP)

(72) Inventor: Haruki Tatsuta, Fukui (JP)

(73) Assignee: SEIREN CO., LTD. (JP)

( * ) Notice: Subject to any disclaimer, the term of this patent is extended or adjusted under 35 U.S.C. 154(b) by 0 days. days.

(21) Appl. No.: 15/329,879

(22) PCT Filed: Mar. 1, 2016

(86) PCT No.: PCT/JP2016/056280
§ 371 (c)(1),
(2) Date: Jan. 27, 2017

(87) PCT Pub. No.: WO2016/147854
PCT Pub. Date: Sep. 22, 2016

(65) Prior Publication Data
US 2017/0267887 A1   Sep. 21, 2017

(30) Foreign Application Priority Data

Mar. 13, 2015 (JP) .................................. 2015-051325

(51) Int. Cl.
*C09D 11/328* (2014.01)
*B41J 11/00* (2006.01)
*B41J 3/407* (2006.01)
*C09D 11/40* (2014.01)

(52) U.S. Cl.
CPC ........... *C09D 11/328* (2013.01); *B41J 3/4078* (2013.01); *B41J 11/002* (2013.01); *C09D 11/40* (2013.01)

(58) Field of Classification Search
CPC ...... C09D 11/328; C09D 11/40; B41J 11/002; B41J 3/4078
See application file for complete search history.

(56) References Cited

U.S. PATENT DOCUMENTS

| 5,631,684 | A | 5/1997 | Takaide et al. | |
|---|---|---|---|---|
| 2002/0158952 | A1* | 10/2002 | Adachi | C09D 11/322 347/100 |
| 2007/0030324 | A1 | 2/2007 | Chevli | |
| 2015/0116419 | A1* | 4/2015 | Oura | C08K 5/053 347/20 |

FOREIGN PATENT DOCUMENTS

| CN | 104271688 | 1/2015 |
|---|---|---|
| JP | 04173874 | 6/1992 |
| JP | 0726478 | 1/1995 |
| JP | 2000239980 | 9/2000 |
| JP | 3918347 | 5/2007 |
| JP | 2009503240 | 1/2009 |
| JP | 5216585 | 6/2013 |
| JP | 2015227398 | 12/2015 |
| WO | 2014129323 | 8/2014 |

OTHER PUBLICATIONS

International Search Report, International Application No. PCT/JP2016/056280, dated May 31, 2016.
Chinese Application No. 20168001257.6, Office Action, dated Jun. 1, 2017.
International Preliminary Report on Patentability, International Application No. PCT/JP2018/056280, dated Sep. 28, 2017.

* cited by examiner

*Primary Examiner* — Bradley Thies
(74) *Attorney, Agent, or Firm* — Perman & Green, LLP

(57) ABSTRACT

An ink set for ink jet printing for improving a wide range of color gamut and providing excellent fastness on ink jet printed materials. The ink set including a yellow ink having Color Index Disperse Yellow 65, a magenta ink having Color Index Disperse Red 362, and a cyan ink having Color Index Disperse Blue 60.

4 Claims, No Drawings

INK SET FOR INK JET AND METHOD FOR PRODUCING INK JET PRINTED MATTER

CROSS REFERENCE TO RELATED APPLICATIONS

This application is the National Stage of International Application No. PCT/JP2016/056280, having an International Filing Date of 1 Mar. 2016, which designated the United States of America, and which International Application was published under PCT Article 21(2) as WO Publication No. 2016/147854 A1, and which claims priority from and the benefit of Japanese Application No. 2015-051325, filed on 13 Mar. 2015, the disclosures of which are incorporated herein by reference in their entireties.

BACKGROUND

1. Field

The present embodiment relates to an ink set for ink jet and a method for producing an ink jet printed matter. Specifically the present embodiment relates to an ink set for ink jet printing comprising an ink includes a disperse dye, for example, an ink set for ink jet printing for ink jet textile printing on a fabric cloth and the like, and a method for producing an ink jet printed matter using the ink set for ink jet printing.

2. Brief Description of Related Developments

Recently an ink jet printing technology has been used in various fields. For example, the ink jet printing technology has been used widely also in the field of textile. In textile printing (hereinafter also referred to as ink jet textile printing) using the ink jet printing technology, production of a printing plate which is indispensable in a conventional printing procedure such as screen printing is unnecessary. Therefore, the ink jet textile printing has advantages such as shortening of printing work, reduction of delivery time and improvement of expression such as gradation and use of multiple colors.

By the way, in conventional screen printing, dyes could have been properly selected according to a color of a commercial product and a required fastness. In the case of expression using a neutral color, for example, beige, a dye having good fastness and being inferior in clarity may be employed. On the other hand, the ink jet textile printing enables multiple colors to be expressed using fixed inks of 4 to 12 colors and has a maximum feature such that a color and a pattern can be easily changed without changing inks. Meanwhile, the ink jet textile printing is featured by expression of not only brilliant colors such as pink but also neutral colors such as beige using similar dyes. As a result, in conventional ink jet textile printing, it is difficult to satisfy enough fastness in commercial products having different required fastness. In particular in the case of ink jet textile printing especially for commercial products requiring light fastness such as outdoor wear and swimming suits, an ink set which is capable of expression in a wide range of color gamut from a brilliant color to a neutral color and satisfies demanded fastness is unknown.

In order to solve the above-mentioned problem, Japanese Patent No. 5,216,585 discloses an ink set comprising a magenta ink comprising C.I. Disperse Red 86, a yellow ink comprising C.I. Disperse Yellow 114, and a cyan ink comprising C.I. Disperse Blue 60 or C.I. Disperse Blue 77. Further, Japanese Patent No. 3,918,347 discloses an ink set comprising a magenta ink comprising C.I. Disperse Red 302, a yellow ink comprising C.I. Disperse Yellow 149, and a cyan ink comprising C.I. Disperse Blue 60.

SUMMARY

However, in any of the ink sets described in Japanese Patent No. 5,216,585 and Japanese Patent No. 3,318,347, fastness (especially light fastness and fastness against chlorinated water) of an obtained ink jet printed matter is not enough.

The present embodiment was made to solve the above-mentioned problem, and a purpose of the present embodiment is to provide an ink set for ink jet printing which can express a wide range of color gamut and can provide excellent fastness on an obtained ink jet printed matter, and a method for producing an ink jet printed matter.

In order to solve the above-mentioned problem, the ink set for ink jet printing and the method for producing an ink jet printed matter of the present invention have the following features.

An ink set for ink jet printing, comprising a yellow ink comprising C.I. Disperse Yellow 65, a magenta ink comprising C.I. Disperse Red 362, and a cyan ink comprising C.I. Disperse Blue 60.

A method for producing an ink jet printed matter by forming an image by applying an ink on a fabric cloth by an ink jet recording method using the above-mentioned ink set for ink jet printing, and further subjecting the fabric cloth to heat treatment.

DETAILED DESCRIPTION

<Ink Set for Ink Jet Printing>

The ink set for ink jet printing of one aspect of the present embodiment (hereinafter also merely referred to as an ink set) comprises a yellow ink, a magenta ink and a cyan ink. The yellow ink comprises C.I. Disperse Yellow 65 (hereinafter also merely referred to as DY65) as a disperse dye. The magenta ink comprises C.I. Disperse Red 362 (hereinafter also merely referred to as DR362) as a disperse dye. The cyan ink comprises C.I. Disperse Blue 60 (hereinafter also merely referred to as DB60) as a disperse dye. The ink set of the present embodiment comprises the yellow ink, magenta ink and cyan ink at least comprising these specific disperse dyes, and by optional combination use of these inks, an ink jet printed matter of a wide range of color gamut can be formed. Further, the obtained ink jet printed matter has excellent fastness. In addition, the ink set may comprise inks of various specific colors such as a black ink and a gray ink. The ink set may also comprise a pale ink (photo ink), for example, in order to reproduce a thinner color.

The yellow ink contains at least DY65 as a disperse dye, and may comprise other disperse dyes. Examples of other disperse dyes include C.I. Disperse Yellow 54, 64, 114, 149, 163, 231, 232, 235, etc.

The magenta ink contains at least DR362 as a disperse dye, and may comprise other disperse dyes. Examples of other disperse dyes include C.I. Disperse Red 86 (hereinafter also merely referred to as DR36), 60, 92, 127, 152, 154, 167, 167:1, 177, 191, 343, and the like. Among these, it is preferable that the ink set further comprise DR86 as a disperse dye for the magenta ink, from a viewpoint of further improvement of fastness (especially light fastness and fastness against chlorinated water) of the obtained ink jet printed matter.

In the magenta ink, a ratio of DR362 to DR86 is not limited particularly. A ratio (W2/W1) of the content of DR362 (W2) to the content of DR86 (W1) is preferably not less than 0.1, more preferably not less than 0.15. Further, the ratio W2/W1 is preferably not more than 0.5, more preferably not more than 0.3. When the ratio W2/W1 is not less than 0.1 and not more than 0.5, an ink jet printed matter of a wider range of color gamut can be formed. Further, fastness (especially light fastness and fastness against chlorinated water) of the obtained ink jet printed matter is further improved.

The cyan ink contains at least DB60 as a disperse dye, and may comprise other disperse dyes. Examples of other disperse dyes include C.I. Disperse Blue 56, 73, 77, 79, 79:1, 165, 165:1, 183, 183:1, 214, 257, 234, 354, 366, and the like.

The content of DY65 in the yellow ink, the content of DR362 in the magenta ink, and the content of DB60 in the cyan ink are preferably from 0.05 to 20% by mass based on the respective total ink amounts. When the content is less than 0.05% by mass, it is difficult to obtain an ink jet printed matter having a sufficient color development. On the other hand, when the content is more than 20% by mass, cost of the ink set is apt to be high.

An average particle size of the disperse dye in each of the respective inks is preferably not less than 50 nm, more preferably not less than 100 nm. Further, the average particle size of the disperse dye is preferably not more than 400 nm, more preferably not more than 300 nm. When the average particle size is from 50 to 400 nm, the disperse dye is excellent in stability in discharging through ink jet nozzles. In addition, a method for granulating the disperse dye into fine particles of the above-mentioned average particle size is not limited particularly. The disperse dye can be granulated into fine particles using, for example, various conventional dispersing machine such as a ball mill, a sand mill, a roll mill, a line mill and a sand grinder.

Next, other components contained in the ink set of the present embodiment are explained. The ink set of the present embodiment comprises the yellow ink containing DY65, the magenta ink containing DR362, and the cyan ink containing DB60, as the respective disperse dyes. Therefore, the components shown below are only examples, and in addition to the other components shown below, components to be used usually in the field of ink sets for ink let printing may be blended optionally to the ink set to the present embodiment.

A dispersant for dispersing the disperse dye is compounded in the ink set. Examples of the dispersant include anionic compounds including anionic surfactants, and nonionic compounds including nonionic surfactants. Examples of the anionic compounds include fatty acid salt, alkyl sulfate ester salt, alkyl benzene sulfonate, alkyl naphthalene sulfonate, lignin sulfonate, dialkyl sulfosuccinate, alkyl phosphate, naphthalenesulfonate and formaldehyde condensate, polyoxyethylene alkyl sulfate, and substituted derivatives thereof. Examples of the nonionic compounds include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene alkyl amine, glycerin fatty acid ester, oxyethylene-oxypropylene block copolymer, and substituted derivatives thereof. These dispersants may be used in combination of two or more thereof.

In the present embodiment, compounding ratios (mass ratio) of the dispersants in the respective inks are preferably 0.2 to 1 based on 1 of the disperse dye. When the compounding ratio (mass ratio) of the dispersant is less than 0.2, the dispersant is hardly adsorbed on the whole particles of the disperse dye. Therefore, the particles of the disperse dye are easily agglomerated to be bulky and settled. As a result, stability of the ink in the discharging is easily lowered. On the other hand, when the compounding ratio of the dispersant is more than 1, a part of the dispersant remains without adsorbing to the particles of the disperse dye. Such dispersant is apt to be precipitated. As a result, stability of the ink in the discharging is easily lowered.

The ink set comprises water and a water-soluble organic solvent as solvents for dispersing the disperse dye. Examples of the organic solvent include alcohols such as methanol, ethanol and isopropyl alcohol; ketone or ketoalcohol such as acetone and diacetone alcohol; ethers such as tetrahydrofuran and dioxane; glycols such as ethylene glycol, diethylene glycol, triethylene glycol, polyethylene glycol, propylene glycol, dipropylene glycol, tripropylene glycol, polypropylene glycol, propanediol, butanediol, pentanediol and hexylene glycol; lower alkyl ethers of glycol such as ethylene glycol monomethyl ether, diethylene glycol monomethyl ether, diethylene glycol monoethyl ether and diethylene glycol monobutyl ether; amines having hydroxyl group such as diethanolamine and triethanolamine; glycerin, 2-pyrrolidone, N-methylpyrrolidone, and the like. These organic solvents may be used in combination of two or more thereof.

In the present embodiment, contents of solvents in the respective inks are preferably not less than 20% by mass, more preferably not less than 40% by mass, further preferably not less than 60% by mass. When the contents of solvents in the respective inks are not less than 40% by mass, clogging of ink jet nozzles is easily prevented. Further, a drying time of the ink is adjusted easily, and oozing of the ink on the fabric cloth is prevented easily.

The respective inks in the present embodiment may comprise an antiseptic agent and an anti-foaming agent. Examples of the antiseptic agent include imidazole compounds such as 2-(4-thiazolyl)benzimidazole and methyl 2-benzimidazole carbamate; thiazole compounds such as 1,2-benzothiazoline-3-on and 2-n-octyl-isothiazoline-3-on; and further iodo, nitrile, phenol, haloalkylthio, pyridine, triazine and bromine compounds. Examples of the anti-foaming agent include organic polar compounds such as lower alcohol, oleic acid and polypropylene glycol, silicone resin, and the like.

In addition, to the respective inks in the present embodiment may be compounded optionally an anti-fungus agent, a pH regulator, a dye dissolving aid, an anti-foaming agent, a conductivity regulator, a color-deepening agent, a level dyeing agent, a penetrating agent, and the like.

The ink set in the present embodiment comprises the yellow ink comprising C.I. Disperse Yellow 65, the magenta ink comprising C.I. Disperse Red 362, and the cyan ink comprising C.I. Disperse Blue 60. Such ink set enables an ink jet printed matter having a wide range of color gamut to be formed, for example, by ink jet textile printing on a substrate such as a fabric cloth. Further, the obtained ink jet printed matter shows excellent fastness.

<Method for Producing Ink Jet Printed Matter>

The method for producing an ink jet printed matter in one aspect of the present embodiment mainly comprises a step of applying an ink on a fabric cloth by an ink jet recording method using the above-mentioned ink set and a heat treatment step. As a result of the heat treatment, the ink jet printed matter having an image formed thereon is produced.

The method for applying an ink on a fabric cloth by an ink jet recording method is not limited particularly. Examples of the method include continuous methods such as a charge modulation method, a micro-dot method, a charge injection control method and an ink mist method; on-demand methods such as a piezo method, a pulse jet method, a Bubble Jet (registered trademark) method and an electrostatic suction method; and the like.

The fabric cloth on which the ink is applied is not limited particularly. Examples of the fabric cloth include polyester-fibers such as a cation dyeable polyester (CDP) fiber, a polyethylene terephthalate (PET) fiber, a polybutylene terephthalate (PBT) fiber, a polytrimethylene terephthalate (PTT) fiber, wholly aromatic polyester fiber and polylactic acid fiber; an acetate fiber, a triacetate fiber, a polyurethane fiber, a nylon fiber or composite fibers thereof.

It is preferable to subject the fabric cloth to pre-treatment before the ink jet textile printing. Examples of a pre-treating agent include a water-soluble polymer, a non-water-soluble inactive organic compound, a flame retardant, an ultraviolet absorber, a reduction preventing agent, an antioxidant, a pH regulator, a hydrotrope agent, an anti-foaming agent, a penetrating agent, a micro-porous structure forming agent, and the like. Among these, a non-water-soluble inactive organic compound is used suitably.

By performing the pre-treatment using a non-water-soluble inactive organic compound, the surface of the fabric cloth is made smooth, and the surface of the fiber is made hydrophobic uniformly. As a result, the ink is easily imparted on the surface of the fabric cloth uniformly.

Examples of the water-soluble polymer include water-soluble polymers such as carboxymethyl cellulose, sodium alginate, guar gum, tara gum, locust bean gum, gum arable, methyl cellulose, polyacrylamide, starch, sodium polyacrylate, sodium polystyrene sulfonate, hydroxyethyl cellulose and polyvinyl alcohol.

Examples of the non-water-soluble inactive organic compound include organic monomers, oligomers and low molecular weight polymers having a melting point of from 40° C. to 150° C. A number-average molecular weight of these non-water-soluble inactive organic compounds is usually not more than 10000, preferably not more than 5000, more preferably from 100 to 2000.

Specific examples of the non-water-soluble inactive organic compound include low molecular weight synthetic resins, hydrocarbon wax compounds, natural wax compounds, higher fatty acid amide compounds, higher alcohol compounds, polyhydric alcohol fatty acid ester compounds, and the like. Among these, preferred examples include lower alkylene polymer compounds such as polyethylene, paraffin wax and polyethylene wax etc., and petrochemical synthetic waxes such as microcrystalline wax, petrolatum and Fisher-Tropsch wax etc.; higher fatty acid amide compounds such as ethylenebis(stearamide), octadecanamide(stearamide), oleamide, methylol stearamide and 12-hydroxystearamide; and polyalcohol higher fatty ester compounds such as glycerin oleate, glycerin stearate, propylene glycol stearate, ethylene glycol stearate and 12-hydroxystearate. Particularly a mixture of a hydrocarbon wax and any one of the other compounds is preferred as the non-water-soluble inactive organic compound from the viewpoint of good emulsion dispersibility.

Examples of the flame retardant include halogen flame retardants, phosphorus flame retardants, inorganic flame retardants, and the like.

Examples of the ultraviolet absorber include benzotriazole, benzophenone, and the like.

Examples of the reduction preventing agent include nitrobenzene sulfonate, a derivative of benzenesulfonic acid, and the like.

Examples of the antioxidant include hindered amine, hindered phenol, and the like.

Examples of the pH regulator include acidic regulators such as malic acid, citric acid, acetic acid, ammonium citrate and monobasic potassium phosphate, and alkaline regulators such as sodium bicarbonate, sodium carbonate, sodium potassium phosphate and sodium acetate. The pH value of the ink is subjected to fine adjustment by adding a pH regulator thereto, thereby allowing a dyeing affinity with fibers constituting the fabric cloth to be controlled finely.

Examples of the hydrotrope agent include urine, polyethylene glycol, thiourea, and the like.

Examples of the anti-learning agent include organic polar compounds such as lower alcohol, oleic acid and polypropylene glycol and a silicone resin.

Examples of the penetrating agent include anionic surfactants such as sodium dodecylbenzenesulfonate, sodium lauryl sulfate; nonionic surfactants such as nonyl phenol and lauryl alcohol; and the like.

Example of the micro-porous structure forming agent includes one prepared by subjecting a water-soluble or sparingly water-soluble low boiling point liquid having a boiling point of from 105° C. to 200° C. to emulsion dispersion uniformly in water in a state of fine particles. Examples of the low boiling point liquid include hydrocarbon toluene and xylene, halogenated hydrocarbon perchloroethylene, monochlorobenzene and dichloropentane, butyl acetate, butyl acrylate, and the like.

Examples of a method for applying the pre-treating agent to the fabric cloth include a pading method, a spraying method, a dipping method, a coating method, a laminating method, a gravure coating method, an ink jet method, and the like.

Returning to the explanation on the production method for the ink jet printed matter, the fabric cloth to which the ink was applied is then subjected to heat treatment for the purpose of dyeing and coloring of the disperse dye.

The heat-treating temperature is approximately from 150° C. to 190° C. When the heat-treating temperature is lower than 150° C., coloring of the disperse dye may be inferior. On the other hand, when the heat-treating temperature is more than 190° C., the fabric cloth may turn yellow or may be deteriorated. Further the heat-treating time is approximately from 0.5 to 60 minutes. When the heat-treating time is less than 0.5 minute, non-uniformity of coloring may arise. On the other hand, when the heat-treating time is more than 60 minutes, color fading of the disperse dye may arise. Example of a suitable heat-treating condition include a temperature of 160° to 180° C. and a time of 5 to 20 minutes.

After the heat treatment, the fabric cloth is subjected to washing and drying adequately by a usual method to obtain an ink jet printed matter. Since the ink of the above-mentioned ink set is used, a vivid and high concentration image of a wide range of color gamut is formed on the obtained ink jet printed matter.

Further, the ink jet printed matter shows excellent fastness. The ink jet printed matter is excellent in, for example, resistance to color fading due to light (light fastness), resistance to stain due to friction (friction fastness), and resistance to color change and color fading due to water sterilized with chlorine (chlorine fastness). Therefore, the ink jet printed matter can be used for various textiles (for example, interiors of a car, clothes (suits, water suits, various outdoor wears, etc.) outdoor advertisement, etc.) even in the case of applications requiring fastness.

One aspect of the present embodiment is described above. However, the present embodiment is not limited to the above-mentioned aspect. The above-mentioned aspect is one aspect of the present embodiment having the following configurations.

1. An ink set for ink jet printing, comprising a yellow ink comprising C.I. Disperse Yellow 65, a magenta ink comprising C.I. Disperse Red 362, and a cyan ink comprising C.I. Disperse Blue 60.
2. The ink set for ink jet printing of the above item (1), wherein the magenta ink further comprises C.I. Disperse Red 86.
3. The ink set for ink jet printing of the above item (2), wherein in the magenta ink, a ratio (W2/W1) of a content of C.I. Disperse Red 362 (W2) to a content of C.I. Disperse Red 86 (W1) is not less than 0.1 and not more than 0.5, preferably from 0.15 to 0.3.
4. A method for producing an ink let printed matter by forming an image by applying an ink on a fabric cloth by an ink jet recording method using the ink set for ink jet printing of any one of the above items (1) to (3), and further subjecting the fabric cloth to heat treatment.

EXAMPLE

The present embodiment is then explained by means of Examples, but is not limited to the Examples.
<Preparation of Disperse Dye Dispersion>
20% by mass of each of the disperse dyes described in the following Table 1, 5% by mass of a dispersant (lignin sulfonate as an anionic surfactant), 0.1% by mass of an antiseptic agent (San-ai bac IT20 available from San-Ai Oil Co., Ltd.), 0.05% by mass of an anti-foaming agent (ShinEtsu Silicone KM-70 available from Nissin Chemical Co., Ltd.) and 73.85% by mass of pure water were mixed. The mixture was subjected to wet grinding with a sand mill for 10 hours in the presence of glass beads to obtain fine particles. Thereafter, the glass beads were removed from the mixture by filtration under reduced pressure to produce the respective dispersions (y1, y2, m1, m2, c1) described in Table 1. An average particle size of the respective disperse dyes formed into fine particles was 150 nm.

TABLE 1

| Dispersion of disperse dye | Disperse Dye |
| --- | --- |
| y1 | C.I. Disperse Yellow 65 |
| y2 | C.I. Disperse Yellow 114 |
| m1 | C.I. Disperse Red 362 |
| m2 | C.I. Disperse Red 86 |
| c1 | C.I. Disperse Blue 60 |

<Preparation of Ink>
(Preparation of Yellow Ink Y1)
20 parts by mass of the dispersion y1 of disperse dye, 20 parts by mass of ethylene glycol, 20 parts by mass of glycerin and 40 parts by mass of pure water were mixed, followed by filtration under reduced pressure to prepare an yellow ink Y1.
(Preparation of Yellow Ink Y2)
20 parts by mass of the dispersion y2 of disperse dye, 20 parts by mass of ethylene glycol, 20 parts by mass of glycerin and 40 parts by mass of pure water were mixed, followed by filtration under reduced pressure to prepare an yellow ink Y2.
(Preparation of Magenta Ink M1)
20 parts by mass of the dispersion m1 of disperse dye, 20 parts by mass of ethylene glycol, 20 parts by mass of glycerin and 40 parts by mass of pure water were mixed, followed by filtration under reduced pressure to prepare a magenta ink M1.

(Preparation of Magenta Ink M2)
10 parts by mass of the dispersion m1 of disperse dye, 10 parts by mass of the dispersion m2 of disperse dye, 20 parts by mass of ethylene glycol, 20 parts by mass of glycerin and 40 parts by mass of pure water were mixed, followed by filtration under reduced pressure to prepare a magenta ink M2.
(Preparation of Magenta Ink M3)
4 parts by mass of the dispersion m1 of disperse dye, 18 parts by mass of the dispersion m2 of disperse dye, 20 parts by mass of ethylene glycol, 20 parts by mass of glycerin and 38 parts by mass of pure water were mixed, followed by filtration under reduced pressure to prepare a magenta ink M3.
(Preparation of Magenta Ink M4)
20 parts by mass of the dispersion m2 of disperse dye, 20 parts by mass of ethylene glycol, 20 parts by mass of glycerin and 40 parts by mass of pure water were mixed, followed by filtration under reduced pressure to prepare a magenta ink M4.
(Preparation of Cyan Ink C1)
25 parts by mass of the dispersion c1 of disperse dye, 20 parts by mass of ethylene glycol, 20 parts by mass of glycerin and 35 parts by mass of pure water were mixed, followed by filtration under reduced pressure to prepare a cyan ink C1.
<Pre-Treatment of Fabric Cloth>
First, a pre-treating agent was prepared by mixing 5.0 parts by mass of carboxymethyl cellulose (a sizing agent, FINE GUM HE available from DAI-ICHI KOGYO SEIYAKU CO., LTD.), 0.3 part by mass of malic acid (a pH regulator available from FUSO CHEMICAL CO., LTD.), 2.0 parts by mass of MS-liquid (an anti-reduction agent available from Meisei Chemical Works, Ltd.) and 92.7 parts by mass of pure water. Then, the obtained pre-treating agent was applied to a fabric cloth of polyester fiber by a dip-nip method. After the dip-nip treatment, the fabric cloth was subjected to drying at 120° C. for 90 seconds with a tenter dryer.

Example 1

JIS Standard Color Digital Image (JIS X 9204:2004 S6 color chart) was printed under the following ink jet conditions using ink sets comprising ink combinations shown in Table 2. Thereafter, the printed fabric cloth was subjected to exposure to moist heat at 175° C. for 10 minutes. Then, the fabric cloth was optionally subjected to washing and drying to produce an ink jet printed matter of Example 1.

TABLE 2

|  | Yellow ink | Magenta ink | Cyan ink |
| --- | --- | --- | --- |
| Ex. 1 | Y1 (DY65) | M1 (DR362) | C1 (DB60) |
| Ex. 2 | Y1 (DY65) | M2 (DR362: DR86 = 1:1) | C1 (DB60) |
| Ex. 3 | Y1 (DY65) | M3 (DR362: DR86 = 0.8:3.6) | C1 (DB60) |
| Com. Ex. 1 | Y2 (DY114) | M4 (DR06) | C1 (DB60) |

Kinds of the disperse dyes in the respective inks and the compounding ratios thereof are shown in the parentheses.
<Ink Jet Conditions>
Ink jet textile printing equipment: On-demand serial type
Nozzle diameter: 50 μm
Driving voltage: 100 V
Frequency: 10 kHz
Resolution: 600 dpi Examples 2 and 3 and Comparative Example 1

Ink jet printed matters of Examples 2 and 3 and Comparative Example 1 were produced in the same manner as in Example 1 except that combination of inks was changed to the combinations shown in Table 2. In Example 2, the ratio (W2/W1) of the content (W2) of DR362 to the content (W1) of DR86 contained in the magenta ink was 1.0. Further, in Example 3, the ratio (W2/W1) of the content (W2) of DR362 to the content (W1) of DR86 contained in the magenta ink was 0.22.

The ink jet printed matters obtained in Examples 1 to 3 and Comparative Example 1 were evaluated based on the following evaluation criteria by the following evaluation methods.

[Evaluation of Color Development]

The ink jet printed matters were observed with naked eyes, and color development thereof was evaluated based on the following evaluation criteria. The results are shown in Table 6.

(Evaluation Criteria)
- ⊚: Printed image is clear enough and has a sufficient concentration.
- ○: Printed image is clear and has a sufficient concentration, or is clear enough and has a proper degree of concentration.
- Δ: Printed image has obviously lower clearness while having a sufficient concentration, or has obviously lower concentration while having enough clearness.
- x: Printed image has obviously lower clearness and a lower concentration.

[Evaluation of Fastness]

Fastness on each of a blue color, a green color, an orange color, a pink color, a gray color and a beige color of Standard Color Digital Image formed on the ink jet printed matters was evaluated. Specifically each of light fastness, fastness to rubbing and fastness to chlorine was evaluated.

<Light Fastness>

Light fastness was evaluated according to JIS L 0843 (3rd exposure method) (classes 1 to 8). Class 8 is the most excellent light fastness. The results are shown in Table 3. Further, the light fastness was synthetically evaluated from the obtained results of evaluation according to the following criteria for judgment. The results are shown in Table 6.

(Criteria for Judgment)
- ⊚: All of six colors are class 7 or 8.
- ○: At least one color is class 6, and other colors are any of classes 6 to 8.
- Δ: At least one color is class 5, and other colors are any of classes 5 to 8.
- x: At least one color is any of classes 1 to 4.

TABLE 3

| | Light fastness (class) | | | | | |
|---|---|---|---|---|---|---|
| | Blue | Green | Orange | Pink | Gray | Beige |
| Ex. 1 | 6 | 7 | 6 | 5 | 5 | 5 |
| Ex. 2 | 7 | 7 | 6 | 6 | 6 | 6 |
| Ex. 3 | 7 | 7 | 7 | 7 | 7 | 7 |
| Com. Ex. 1 | 7 | 4 | 4 | 6 | 4 | 4 |

<Fastness to Rubbing>

Fastness to rubbing was evaluated according to JIS L 0849 (Gakushin-Type Rubbing Tester) (classes 1 to 5). Class 5 is the most excellent fastness to rubbing. The results are shown in Table 4. Further, the fastness to rubbing was synthetically evaluated from the obtained results of evaluation according to the following criteria for judgment. The results are shown in Table 6.

(Criteria for Judgment)
- ⊚: All of six colors are class 5.
- ○: At least one color is class 4, and other colors are class 4 or 5.
- Δ: At least one color is class 3, and other colors are any of classes 3 to 5.
- x: At least one color is class 1 or 2.

TABLE 4

| | Fastness to rubbing (class) | | | | | |
|---|---|---|---|---|---|---|
| | Blue | Green | Orange | Pink | Gray | Beige |
| Ex. 1 | 4 | 4 | 4 | 5 | 5 | 5 |
| Ex. 2 | 4 | 4 | 4 | 5 | 5 | 5 |
| Ex. 3 | 4 | 4 | 4 | 5 | 5 | 5 |
| Com. Ex. 1 | 4 | 4 | 4 | 5 | 5 | 5 |

<Fastness to Chlorine>

Fastness to chlorine was evaluated according to JIS L 0884 (B method) (classes 1 to 5). Class 5 is the most excellent fastness to chlorine. The results are shown in Table 5. Further, the fastness to chlorine was synthetically evaluated from the obtained results of evaluation according to the following criteria for judgment. The results are shown in Table 6.

(Criteria for Judgment)
- ⊚: All of six colors are class 5.
- ○: At least one color is class 4, and other colors are class 4 or 5.
- Δ: At least one color is class 3, and other colors are any of classes 3 to 5.
- x: At least one color is class 1 or 2.

TABLE 5

| | Fastness to chlorine (class) | | | | | |
|---|---|---|---|---|---|---|
| | Blue | Green | Orange | Pink | Gray | Beige |
| Ex. 1 | 4 | 5 | 4 | 3 | 3 | 2 |
| Ex. 2 | 5 | 5 | 5 | 4 | 4 | 4 |
| Ex. 3 | 5 | 5 | 5 | 5 | 5 | 5 |
| Com. Ex. 1 | 5 | 3 | 3 | 5 | 2 | 2 |

TABLE 6

| | Total evaluations | | | |
|---|---|---|---|---|
| | Color development | Light fastness | Fastness to rubbing | Fastness to chlorine |
| Ex. 1 | ○ | Δ | ○ | Δ |
| Ex. 2 | ○ | ○ | ○ | ○ |
| Ex. 3 | ⊚ | ⊚ | ○ | ⊚ |
| Com. Ex. 1 | ○ | X | ○ | X |

As shown in Table 6, it was found that as compared with the ink jet printed matter of Comparative Example 1 produced using the conventional ink set, the ink jet printed matters of Examples 1 to 3 produced using the ink sets comprising the DY65-containing yellow ink, the DR362-containing magenta ink and the DB60-containing cyan ink have color development equal to or higher than that of Comparative Example 1, and can express a wide range of color gamut. Further as compared with the ink jet printed matter of Comparative Example 1, the ink jet printed matters of Examples 1 to 3 are excellent in each fastness. Particularly the ink jet printed matters of Examples 2 and 3 produced using the ink set prepared in combination use of DR362 and DR86 as the disperse dyes for the magenta ink are more excellent in light fastness and fastness to chlorine. Among the ink jet printed matters, the ink jet printed matter of Example 3 is excellent particularly in light fastness and fastness to chlorine, and is further excellent in color development.

What is claimed is:

1. An ink set for ink jet comprising:
   In combination; a yellow ink comprising Color Index Disperse Yellow 65,
   a magenta ink comprising Color Index Disperse Red 362, and
   a cyan ink comprising Color Index Disperse Blue 60.

2. The ink set for ink jet of claim 1, wherein the magenta ink further comprises Color Index Disperse Red 86.

3. The ink set for ink jet of claim 2, wherein the magenta ink comprises a ratio of Color Index Disperse Red 362 parts by mass to a Color Index Disperse Red 86 parts by mass of no less than 0.1 and no greater than 0.5.

4. A method for producing an ink jet printed matter by forming an image by applying an ink on a fabric cloth by an ink jet recording method using the ink set for ink jet printing of claim 1, and subjecting the fabric cloth to heat treatment.

* * * * *